United States Patent [19]

Batt et al.

[11] 3,750,736

[45] Aug. 7, 1973

[54] APPARATUS FOR THE ISOLATION OF α-OLEFIN HYDROCARBON COPOLYMERS FROM SOLUTION

[75] Inventors: Richard S. W. Batt, Wilmington, Del.; Louis A. De Frate, Kennett Square, Pa.

[73] Assignee: E. J. du Pont de Nemours and Company, Wilmington, Del.

[22] Filed: Dec. 28, 1970

[21] Appl. No.: 102,117

Related U.S. Application Data

[63] Continuation-in-part of Ser. No. 782,821, Dec. 11, 1968, abandoned.

[52] U.S. Cl. ............... 159/16 S, 159/22, 159/25 A, 203/96
[51] Int. Cl. ...... B01d 1/14, B01d 3/34, B01d/1/100, B01d 3/38
[58] Field of Search .................. 159/16 A, 16 S, 22, 159/48 L, DIG. 10, 2, 3, 4, 7, 48 R, 25 A; 203/96; 23/274

[56] References Cited
UNITED STATES PATENTS

| | | | |
|---|---|---|---|
| 1,982,518 | 11/1934 | Howard | 23/165 X |
| 2,915,489 | 12/1959 | White | 260/33.6 |
| 3,296,240 | 1/1967 | MacDonald et al. | 260/93.7 |
| 2,599,067 | 6/1952 | Otto | 159/3 X |
| 2,611,751 | 9/1952 | Scott | 260/85.1 X |
| 2,957,855 | 10/1960 | McLeod | 260/88.2 |
| 2,970,089 | 1/1961 | Hunt et al. | 203/91 |
| 3,050,113 | 8/1962 | Rundquist | 159/13 |
| 3,303,180 | 2/1967 | Beckmann et al. | 260/94.7 X |

FOREIGN PATENTS OR APPLICATIONS

| | | | |
|---|---|---|---|
| 871,281 | 6/1961 | Great Britain | 159/48 R |
| 1,019,482 | 2/1966 | Great Britain | 159/16 S |
| 1,593,503 | 7/1970 | France | 159/48 |

Primary Examiner—Norman Yudkoff
Assistant Examiner—J. Sofer
Attorney—Alanson G. Bowen, Jr.

[57] ABSTRACT

Apparatus and process for the steam isolation of elastomeric α-olefin polymers from organic solvent solution by atomizing the solution with steam in an atomizing nozzle; passing the effluent from the nozzle through a stripping tube operated in the spray-flow regime and having inner walls essentially parallel throughout the length of the tube, and from the stripping tube into a flash chamber; whereby solvent-swollen polymer crumb can be collected and removed from the flash chamber. Means are disclosed whereby agglomeration of polymer on the inner walls of the stripping tube and flash chamber is prevented, and whereby entrainment of polymer crumb and undue pressurization by jet pumping are avoided.

6 Claims, 2 Drawing Figures

United States Patent [19]
Batt et al.
[11] 3,750,736
[45] Aug. 7, 1973
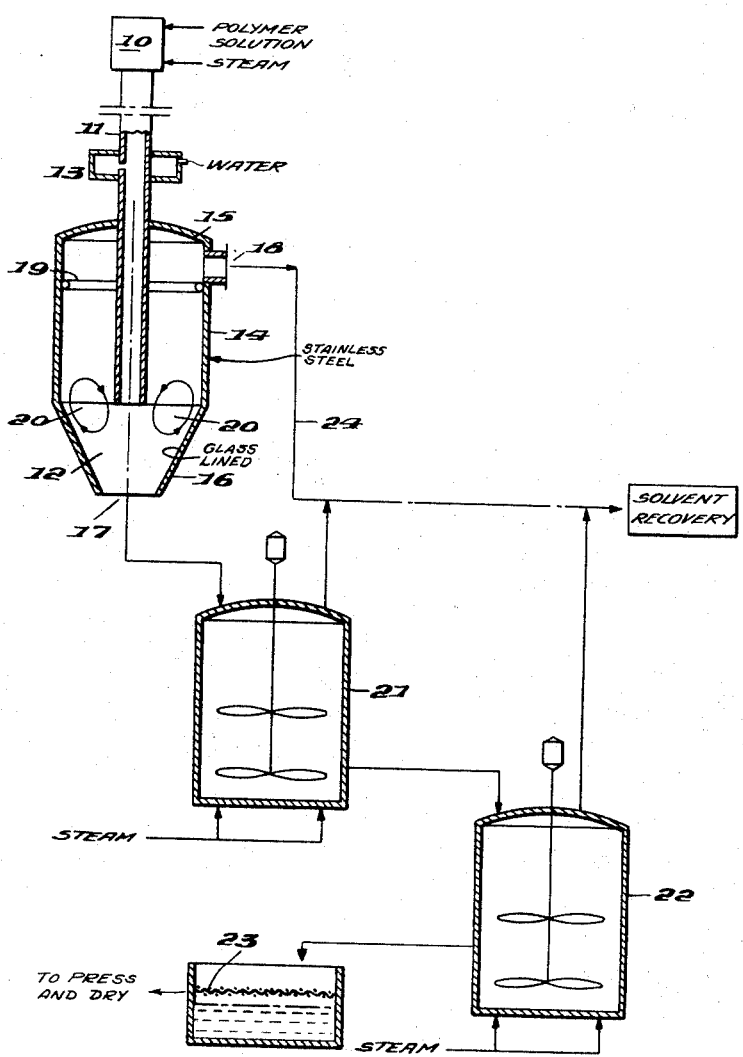

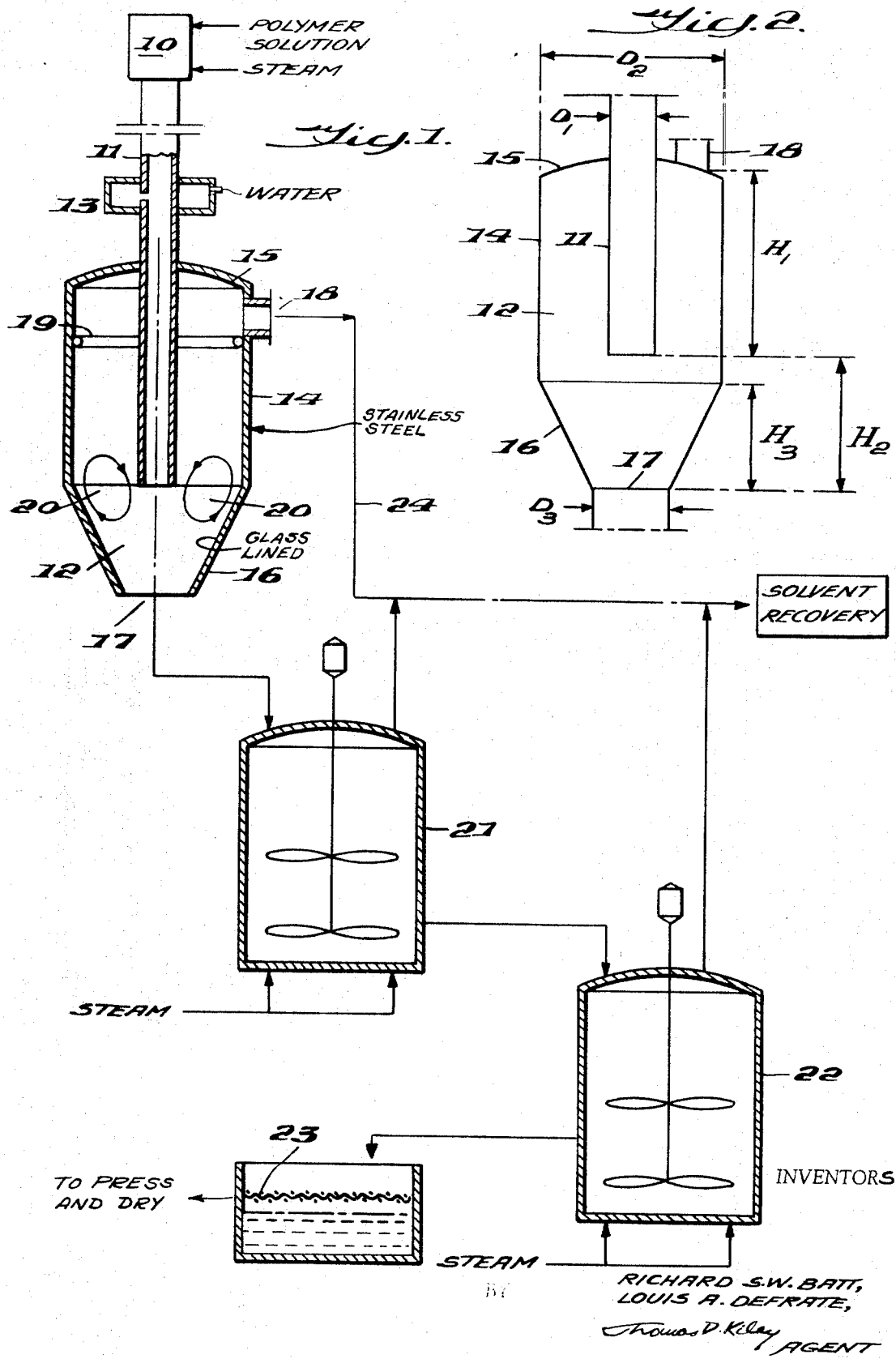

APPARATUS FOR THE ISOLATION OF α-OLEFIN HYDROCARBON COPOLYMERS FROM SOLUTION

This application is a continuation-in-part of application Ser. No. 782,821 filed Dec. 11, 1968, now abandoned.

BACKGROUND OF THE INVENTION

This invention relates to the isolation of α-olefin hydrocarbon copolymers and, more particularly, to the steam isolation of ethylene copolymer elastomers from their solutions in organic solvents.

Alpha-olefin hydrocarbon elastomers, such as terpolymers of ethylene, propylene, and non-conjugated dienes, are being produced in increasingly large quantities. In general, these polymers are produced by solution polymerization, and their amorphous nature presents certain problems in isolation from solution. For example, if isolation is attempted by mixing the polymer solution into hot water, the concentrated polymer solution tends to agglomerate severely unless the isolation is conducted in the presence of a surfactant. The presence of a surfactant in the isolated polymer can be undesirable and it is advantageous to provide a process which does not require its use. Accordingly, the art has turned to steam isolation wherein polymer solution and steam are mixed in a jet device. A typical process is shown in British Patent No. 1,019,482. Details of one such process applied to α-olefin hydrocarbon elastomers are disclosed in U.S. application Ser. No. 634,753 of Violette and Wieland, filed Apr. 28, 1967, now abandoned. In both of the above-cited disclosures, the effluent from the jet device passes through a flaring stripper tube into a flash chamber. The diameter of the stripper tube gradually increases from the inlet of the tube to the outlet. It now appears that, as to α-olefin elastomers, such processes are not satisfactory. Build-up of the tacky polymer crumb on the inner wall of the stripper tube has caused clogging and frequent shut-downs.

SUMMARY OF THE INVENTION

There is provided in an enclosed flash chamber for the steam isolation of an elastomeric α-olefin hydrocarbon polymer from an organic solution having:
a. sidewalls, a roof, and a floor;
b. vapor removal means in an upper portion of the chamber;
c. an elongate stripper tube passing vertically through the roof and opening into the chamber at a point substantially below the vapor removal means;
d. the floor sloping downwardly to a polymer removal port located directly below the stripper tube; and
e. means for continuously water-washing the interior surfaces of the sidewalls and floor;
the improvement wherein:
the stripper tube is of circular or elliptical cross-section and
a. $H_1$ is greater than or equal to about $2.0 + 0.75 (D_2 - D_1)$;
b. $V$ is less than or equal to $0.8/\sqrt{\rho}$;
c. $(D_3 - D_1)/2H_3$ is about 0.03 to 0.18; and
d. $(D_2 - D_3)/2H_3$ is about 0.35 to 1.0.

There is also provided, in a process for isolating an elastomeric α-olefin hydrocarbon copolymer from an inert volatile organic solvent solution in which the copolymer concentration is up to about 25 percent by weight by separately introducing said solution and about 2 to 10 pounds of steam per pound of copolymer into an atomizing nozzle, partially flashing solvent from said solution, passing the effluent from said nozzle through a stripper tube operated in the spray-flow regime to a flashing chamber, polymer crumb in the effluent from the stripper tube containing less than about 50 weight percent solvent, passing the flashed effluent through a kettle containing hot water and continuously sparged by steam and subsequently collecting the resulting polymer crumbs containing less than about 1.5 percent solvent by weight, the improvement of passing the effluent from the atomizing nozzle along a linear path defined by a stripper tube whose inner walls are essentially parallel throughout their length and having a circular or elliptical cross-section.

The stripper tube of the invention has wholly obviated the fouling problem which plagued the flared tubes of the prior art. Since the configuration of the instantly disclosed stripper tube brings the walls of the tube more directly into the path of the descending solution droplets and defines a more restricted passage for the same, this is indeed surprising.

BRIEF DESCRIPTION OF THE DRAWINGS

FIG. 1 is a schematic flow sheet of a process depicting the isolation of copolymers according to this invention.

FIG. 2 is a schematic view of a preferred flash chamber with stripper tube for use in connection with this invention.

DESCRIPTION OF THE INVENTION

The α-olefin copolymer elastomers to be isolated in accordance with this invention are primarily the copolymers of at least one α-monoolefin such as ethylene and propylene, preferably containing units of at least one non-conjugated hydrocarbon diene. Representative of the latter are 1,4-hexadiene, dicyclopentadiene, 5-methylene-2-norbornene, 5-ethylidene-2-norbornene, and 1,5-cyclooctadiene. Preferred dienes are 1,4-hexadiene and 5-ethylidene-2-norbornene. Suitable monomers, polymers and their preparation are described in Gresham & Hunt, U.S. Pat. No. 2,933,480; Adamek et al., U.S. Pat. No. 3,211,709; Gladding, U.S. Pat. No. 3,093,621; Gladding and Robinson, U.S. Pat. No. 3,093,620; Tarney, U.S. Pat. No. 3,000,866, Natta et al., U.S. Pat. No. 3,260,708; Fisher, U.S. Pat. No. 3,063,973; Weinmayr, U.S. Pat. No. 2,975,189 and British Pat. No. 857,183.

The solution consists essentially of the water-insoluble copolymer and a volatile inert organic liquid. The term "inert" means that the liquid does not adversely affect the copolymer or the isolation thereof by the process of the present invention; the term "volatile" means that the liquid can be steam distilled at atmospheric pressure at temperatures below about 100°C. The partial pressure of the solvent in the steam treatment zone will depend on the solvent-polymer equilibrium. In general, the preferred solvents have a boiling point not exceeding about 150°C. at atmospheric pressure. Higher boiling solvents can be removed by atmospheric steam distillation at temperatures below 100°C. but more steam is required and the rates are lower. Materials which are relatively high boiling can be employed but are less readily removed. Representative solvents include aliphatic hydrocarbons such as pentane, hexane, heptane, or isooctane; petroleum ether; cycloaliphatic compounds such as cyclopentane and cyclohexane; aromatic hydrocarbons such as benzene, toluene, mixed xylenes, cumenes, and ethyl benzene; halogenated aliphatic hydrocarbons such as carbon tetrachloride, tetrachloroethylene, trichloroethylene, and dichlorodifluoromethane; chlorinated aromatic hydrocarbons such as chlorobenzene and meta-fluorotoluene. Compatible mixtures of these solvents can be employed by those skilled in the art when desired. The solution most often used is the effluent from the copolymerization vessel wherein the copolymer product was made. It is preferred that practically all the polymerization catalyst be removed by any conventional method prior to atomization of the copolymer solution to prevent plugging of the spray nozzle.

The concentration of the copolymer solution is not critical but should be low enough to permit convenient handling. As will be understood by those skilled in the art, other conditions being equal, the solution viscosity will decrease as the temperature is raised and/or the concentration is lowered. The viscosity also depends on the degree of branching and the molecular weight of the copolymer; the greater the branching and the lower the molecular weight, the lower the viscosity. Frequently, the copolymer concentration will range up to about 25 percent by weight, more concentrated solutions often being too viscous for convenient large-scale handling. It is preferred that the copolymer concentration be about 3 to 15 percent by weight. The copolymer solution flow rate is typically up to about 300,000 lb/hr.

In general, it is preferred that the copolymers have Mooney viscosities (ASTM Method D 1646–61; ML–4/250°F.) of at least about 10, however, the viscosity is not critical to the successful operation of this invention. The tendency of the copolymers to agglomerate when their solutions are treated with steam and water tends to increase as the Mooney viscosities decrease.

Referring now to FIG. 1, polymer solution and steam are introduced into the atomizing nozzle 10. A preferred nozzle is the annularly chambered nozzle disclosed in U.S. application Ser. No. 634,754 of Stupakis, filed Apr. 28, 1967, now U.S. Pat. No. 3,423,028. Within the atomizer, polymer solution under pressure and high-pressure steam (e.g., about 2–10 pounds per pound of dry polymer and at e.g., 150 psig. or more) are interacted to cause a high energy atomization in a central zone of the atomizer. The preferred steam rate is about 3 to 12 pounds per pound of dry polymer at 150 psig. or more. Effluent steam, solvent vapor, and solution droplets pass into an elongate stripper tube 11 which is a circular or elliptical cylinder, and which is constructed of conventional chemical process equipment materials, such as stainless steel. The stripper tube is of length sufficient to evaporate solution droplets carried therein down to less than about 50 weight percent solvent content (most preferably less than about 25 weight percent), before the droplets are flashed into the flash chamber 12. The stripping tube 11 can optionally be provided with a water ring 13 constituted by a collar or flange which permits introduction of water through openings spaced around the wall of the tube. The flow of steam, solvent vapor, and solution droplets through the stripping tube 11 is cocurrent.

It is desired that the stripping tube 11 be operated in the spray-flow regime. For a given flow of polymer solution, steam and water and desired pipe diameter, those skilled in the art can make suitable calculations to determine conditions in which the spray-flow regime will operate. Reference may be had to the article by Ovid Baker in "Oil and Gas Journal," July 26, 1954, page 185. Such determinations and calculations are well within the skill of the art. The residence time of the solution droplets passing through the stripping tube is preferably from about 0.3 to about 0.05 second. The velocity of vapor in the stripping tube should be held to less than about 700 ft./sec.

The effluent from the stripper tube 11 is flashed into a flash chamber 12 defined by sidewalls 14, roof 15, and a floor 16 which slopes downwardly to a polymer removal port 17 preferably perpendicularly centered on the longitudinal axis of the stripper tube and located beneath the tube. The stripper tube is preferably centrally disposed in the flash chamber. The flash chamber is of conventional construction, such as stainless steel, and can be ceramic (e.g., glass) lined. The flash chamber floor 16 preferably is in the form of an inverted cone truncated by the polymer removal port 17. Alternatively, a conventional dish-shaped vessel floor can be employed. Flashed solvent is removed by vapor removal means such as conduit 18 located in the upper portion of the flash chamber illustrated in the drawings. The flash cahmber 12 permits a first stage of separation of the solvent and steam vapor from the polymer. Its sidewalls and floor are continuously washed down with water, thereby washing the polymer in the form of a solvent-swollen crumb, into kettle 21. The solvent content of the solvent-swollen crumb is preferably less than about 25 weight percent. Means such as water ring 19 can be provided to wash the crumb from the flash chamber. Effluent leaving the stripper tube 11 can form toroidal eddies 20 in the flash chamber, and it is important as described hereinafter that adequate disengaging height above such eddies be provided to hold polymer crumb entrainment in vapor removed through conduit 18 to an acceptable level (e.g., less than about 2 to 3 lbs. polymer/50,000 lb. vapor). If desired, secondary recovery means such as a cyclone (not shown) can be placed in solvent recovery line 24 to recover what little crumb is carried over with solvent vapor.

As noted above, the flashed polymer crumb is washed through polymer removal port 17 into kettle 21. The kettle contains hot water and is continuously sparged by steam, preferably about 1 to 4 pounds of steam per pound of dry polymer, as shown in FIG. 1, thereby driving off solvent to solvent recovery operation. The polymer crumb from kettle 21 can optionally be passed into kettle 22 containing hot water. Kettle 22 can optionally be sparged with steam. A vacuum extruder can be used instead of either kettles 21 or 22.

Both kettles are provided with high-speed agitators which are run at a high rate (e.g. 80–100 rpm) and have blade designs which direct the polymer crumbs to the bottom where they are removed therefrom as depicted in FIG. 1. The effluent from kettle 22 is directed onto a screen 23 to separate the water from the polymer crumb. At this point, the polymer crumb should contain less than about 1.5 percent solvent; it is conveyed to a press which mechanically expresses the water from the crumb. A suitable press is that disclosed in Burner U.S. Pat. No. 3,225,453 and commercially available from the French Oil Mill Machinery Co. The output from the press can be fed to a conventional air drier, if desired.

In addition to fouling on the inner walls of the stripper tube, three major problem areas have arisen in industrial application of steam isolation processes employing a stripper tube-flash chamber combination. First, many such installations have been plagued by undue entrainment of polymer crumb in removed vapor. Secondly, impact on the floor and walls of the flasher chamber of droplets carried by the jet emerging from the stripper tube has in some cases resulted in troublesome buildup of solid polymer in the flash chamber. Thirdly, it has been discovered that in some cases the effluent from the stripper tube causes undue pressurization of the kettle into which polymer crumb is washed by a "jet pump" effect. To some extent, these problems are alleviated in practice by a) provision of secondary separation means such as a cyclone to collect entrained crumb; b) increase in water wash to decrease the deleterious effect of impact; and c) throttling a control valve placed in the vapor line from the first kettle.

It has now been discovered, however, that the problems encountered by the prior art are obviated and highly efficient operation achieved by observance of certain criteria in design of the stripper tube-flasher combination. Those criteria are discussed with reference to FIG. 2 which depicts a flash chamber similar to that of FIG. 1 with the exception that, for purpose of illustration, the vapor removal conduit 18 is shown entering through the roof of the chamber. In FIG. 2:

$D_1$ is the diameter of the stripper tube 11, ft.;

$D_2$ is the diameter of the flash chamber 12, ft.;

$D_3$ is the diameter of the polymer removal port 17, ft.;

$H_1$ is height from the bottom of the stripper tube 11 to the bottom of the vapor removal conduit 18, ft.;

$H_2$ is the height from the polymer removal port 17 to the bottom of the stripper tube 11, ft.; and $H_3$ is the height from the polymer removal port 17 to the top of the conical floor 16, ft.

Now referring to the dimensions as depicted in FIG. 2 and defined above, it has been discovered that entrainment is greatly diminished where:

a. $H_1$ is greater than or equal to about $2.0 + 0.75 (D_2 - D_1)$; and
b. $V$ is less than or equal to $0.8/\sqrt{p}$, wherein $V$ is the vapor velocity in the annular space within the flash chamber, ft./sec., and $p$ is the vapor density, lb./ft.$^3$.

Moreover, it has been discovered that the impact and jet pumping problems are obviated when c. the quantity $(D_3 - D_1)/2H_2$ is about 0.03 to 0.18; and
d. the quantity $(D_2 - D_3)/2H_3$ is about 0.35 to 1.0. Preferably, $H_2$ is about equal to $H_3$.

The invention will now be described with reference to a specific operating procedure; parts, proportions and percentages are by weight unless otherwise specified.

The apparatus employed is like that described in FIG. 1. The stripper tube-flasher combination is dimensioned as follows:

$H_1 = 14$ ft.  $D_1 = 10$ inches
$H_2 = 10$ ft.  $D_2 = 12$ ft., 9 inches
$H_3 = 7$ ft.  $D_3 = 1$ ft., 8 inches.

The stripper tube's inner walls are essentially parallel, and the overall length thereof is about 40 feet.

An annularly chambered mixing nozzle like that disclosed in U.S. Application Ser. No. 634,754 of Stupakis, filed Apr. 28, 1967, now U.S. Pat. No. 3,423,028 is employed to atomize with steam a solution of approximately 5 weight percent of elastomer in tetrachloroethylene. The nozzle employed contains seven pairs of steam-polymer contact rings. A terpolymer prepared in accordance with the procedures of U.S. Pat. No. 2,933,480 and having the following composition is selected: 42 percent propylene; 4.35 percent 1,4-hexadiene and the remainder being ethylene. The dry polymer has a Mooney viscosity of about 40 (ML–4/250°F.) and an inherent viscosity of about 2.5 (measured at 30°C. on a solution of 0.1 g. polymer in 100 ml. of tetrachloroethylene). About 70,000 pounds per hour of solution and about 8 pounds of steam per pound of dry polymer per hour are delivered to the nozzle under pressure. The polymer solution is fed at about 100°C. and 70 psig. The steam is saturated at about 150 psig. Effluent from the nozzle travels through the stripper tube at vapor velocity of about 475 ft./sec. and is flashed therefrom into the flash chamber. The polymer solution droplets emerging from the stripper tube typically show a reduction in solvent concentration from 95 percent down to less than about 50 percent. Polymer crumb is washed from the flash chamber by water coursing down the walls and floor thereof. About 127,000 pounds of water per hour is admitted to the flash chamber through water ring 19. Additional water is added if desired through water-ring 13. Polymer crumb from the flash chamber is subsequently washed, screened and pressed as described with reference to FIG. 1, and polymer crumb having less than 1.5 weight percent solvent recovered.

In startling contrast to the situation heretofore existing, the process substantially as described above has been carried on at an industrial level for many months without once requiring shutdown to clean the inner surface of the stripper tube. This is particularly surprising considering that, as compared to prior practice, the passage through which effluent from the nozzle must pass has been restricted to parallelize the walls thereof. On the other hand, a previously employed stripper tube flared so that its diameter increased by a factor of 3 over the length thereof required shutdown for cleaning approximately once every two weeks.

We claim:

1. In an enclosed flash chamber for the steam isolation of an elastomeric α-olefin hydrocarbon polymer from an organic solution having:
    a. sidewalls, a roof, and a floor;
    b. a vapor removal conduit in an upper portion of the chamber;
    c. an elongated stripper tube passing vertically through the roof and opening into the chamber at a point substantially below the vapor removal conduit;
    d. the floor sloping downwardly and inwardly to a polymer removal port located directly below the stripper tube; and
    e. means for continuously water-washing the interior surfaces of the sidewalls and floor;
the improvement wherein the stripper tube is of constant circular cross-section and 1. $H_1$ is greater than or equal to about $2.0 + 0.75(D_2-D_1)$;
2. $V$ is less than or equal to $0.8/\sqrt{\rho}$
3. $(D_3-D_1)/2H_3$ is about 0.03 to 0.18; and
4. $(D_2-D_3)/2H_3$ is about 0.35 to 1.0;

wherein $H_1$ is height in feet from the bottom of the stripper tube to the bottom of the vapor removal conduit, $D_2$ is diameter in feet of the flash chamber, $D_1$ is diameter in feet of the stripper tube, $V$ is vapor velocity in feet/sec. in the annular space within the flash chamber of vapor passing from said stripper tube to said vapor removal conduit, $\rho$ is vapor density in lb/ft³, $D_3$ is diameter in feet of the polymer removal port, and $H_3$ is height in feet from the polymer removal port to the top of the sloped floor.

2. The flash chamber of claim 1 wherein the stripper tube is of length to provide sufficient residence time for evaporation of polymer solution droplets carried therein down to less than about 25 weight percent solvent content before the droplets are flashed into the flash chamber from the stripper tube.

3. The flash chamber of claim 2 wherein the chamber floor defines an inverted cone truncated by the polymer removal port, and wherein the said axis is centrally disposed in the flash chamber.

4. The flash chamber of claim 3 wherein the vapor removal conduit is positioned in the roof of the chamber.

5. The flash chamber of claim 4 wherein $H_2$ is about equal to $H_3$, where $H_2$ is the height in feet from the polymer removal port to the bottom of the stripper tube.

6. The flash chamber of claim 5 wherein the stripper tube is internally fitted with a water ring above its entrance into the chamber.

* * * * *